United States Patent
Sood (10) Patent No.: US 12,063,708 B1
(45) Date of Patent: Aug. 13, 2024

(54) ROUTING SUBSCRIBER MESSAGES TO DIFFERENT HOME SERVERS

(71) Applicant: T-Mobile Innovations LLC, Overland Park, KS (US)

(72) Inventor: Romil Sood, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 139 days.

(21) Appl. No.: 17/466,153

(22) Filed: Sep. 3, 2021

(51) Int. Cl.
H04W 8/08 (2009.01)
H04W 8/26 (2009.01)

(52) U.S. Cl.
CPC .............. *H04W 8/08* (2013.01); *H04W 8/26* (2013.01)

(58) Field of Classification Search
CPC ........... H04W 8/00; H04W 8/02; H04W 8/04; H04W 8/06; H04W 8/065; H04W 8/08; H04W 8/18; H04W 8/26; H04W 8/265; H04W 8/28
See application file for complete search history.

(56) References Cited

U.S. PATENT DOCUMENTS

| | | | |
|---|---|---|---|
| 10,051,527 B2 | 8/2018 | John et al. | |
| 2015/0358889 A1* | 12/2015 | Arora | H04W 76/12 370/338 |
| 2016/0183178 A1* | 6/2016 | Marimuthu | H04W 8/183 455/432.1 |
| 2017/0302618 A1* | 10/2017 | Porika | H04M 15/63 |
| 2020/0145892 A1 | 5/2020 | Gambhir-Parekh | |
| 2020/0187060 A1* | 6/2020 | Yau | H04W 36/0022 |

FOREIGN PATENT DOCUMENTS

| | | | | |
|---|---|---|---|---|
| CN | 1565116 A | * | 1/2005 | ............. H04L 29/06 |
| WO | WO-9966742 A1 | * | 12/1999 | ............. H04W 8/26 |

* cited by examiner

*Primary Examiner* — Matthew W Genack
(74) *Attorney, Agent, or Firm* — Jones Robb, PLLC (57) ABSTRACT

Routing servers (DRA, STP, GTP proxy) coupled to one or more home servers (HLR, HSS) enforce a policy on SS7 or LTE or GTP messages destined to a core network associated with the one or more home servers. IMSI ranges associated with the different home servers are used to filter and route messages at the DRA, STP, and GTP proxy servers.

18 Claims, 8 Drawing Sheets

ROUTING SUBSCRIBER MESSAGES TO DIFFERENT HOME SERVERS

TECHNICAL BACKGROUND

As communication networks evolve and grow, there are ongoing challenges in communicating data across different types of networks. Different types of networks can include wireless networks, packet-switched networks such as the internet, satellite networks, public/private networks, local area networks (LANs), wide area networks (WANs), and any network enabling communication between different types of electronic devices. Other types of communication networks in various combinations may be envisioned by those having ordinary skill in the art in light of this disclosure. One type of communication network described herein includes telecommunications networks, such as 5G New Radio (NR) networks, 4G LTE networks, etc. Such networks utilize specialized devices, such as gateways, routers, switches, etc. that enable communication between sub-network types, such as radio access networks (RANs), core networks, and so on, as further described herein. Further, data in the order of billions of packets per second traverses modern networks, thus requiring robust packet processing mechanisms that cause excessive signaling between the control and user planes, particularly as it relates to core networks.

Core networks include various network elements, including controller nodes such as mobility management entities (MME) and access and mobility functions (AMF), home servers such as home subscriber servers (HSS), as well as routing servers such as diameter routing agents (DRA), and various other nodes for enabling communication between wireless devices and nodes on different networks. Generally, the MME is connected to the HSS directly in an operator's internal network (i.e., core network), and the MME and HSS operate in a server/client mode. When roaming wireless devices attempt to access the core network, the scenario is complicated when a local (e.g., serving) MME needs to communicate with a foreign (e.g., roaming or external) HSS. In these cases, the DRA deployment is critical to increase the efficiency of the networks. The DRA is located on an edge of a core network. Given multiple subscribers of both internal and external networks (e.g. 2 different core networks each having their own HSS, HLR, etc), routing traffic is challenging because it is not defined in the 3GPP standard. In particular, as internet of things (IOT) devices proliferate, there are many different use cases associated with different subscriber devices, and as network technology evolves, not all subscriber devices can be flashed or migrated to new updated networks. Thus, there is a need to handle messages, such as connection requests and control and packet data, originating from subscriber devices associated with various different networks, and route the messages to the appropriate home servers. Existing DRAs and other routing servers such as signaling transfer points (STP) cannot handle these incoming messages and route them appropriately, which causes connection errors, and issues with optimal user experience for subscriber devices.

Overview

Exemplary embodiments described herein include methods and systems for routing subscriber messages to different home servers. An example method for routing subscriber messages to different home servers includes receiving a message associated with a wireless subscriber attempting to access network services from one or more core networks, parsing the message to retrieve a first wireless device identifier, and upon the first wireless device identifier meeting a criteria, routing the message to one of a plurality of home servers associated with a first core network.

An example system for routing subscriber messages to different home server includes one or more core networks, one or more routing servers respectively associated with each of the one or more core networks, and a processing node communicatively coupled to the one or more routing servers. The processing node comprises at least a memory and a processor for performing operations comprising receiving messages associated with a wireless device attempting to attach to the one or more core networks, and based on a subscriber identifier of the wireless device, routing the messages to a home server associated with one of the one or more core networks.

An example processing node for routing subscriber messages to different home server includes a processor and a memory for storing logic that is executed by the processor to perform operations including instructing a first routing server coupled to a first network that messages from a first subset of mobile subscriber identifiers is routed to a first home server associated with the first network, and instructing the first routing server that messages from a second subset of mobile subscriber identifiers is routed to a second home server associated with a second network, wherein the processing node determines which of the first and second subsets of mobile subscriber identifiers is associated with the first or second network based on checking one or more IMSI range rules.

DETAILED DESCRIPTION

Example methods and systems described herein for routing traffic from subscribers to different core networks. Different core networks have different core network elements, such as home location registers (HLR), home subscriber servers (HSS), and other servers, gateways, etc. In an example, a routing server such as a centralized routing engine (CRE) coupled to one or more home servers (e.g. home location register HLR or home subscriber server HSS) can enforce a policy or rule on user data/traffic destined to a core network associated with the one or more home servers. In an exemplary embodiment, the centralized routing engine comprises a diameter routing agent (DRA) and/or a smart DRA (S-DRA). Further, the CRE can include a signaling transfer point (STP) and/or smart STP (S-STP), depending on the type of signaling being used in the network as further described below. Additional examples are illustrated describing GPRS tunneling protocol (GTP) proxy servers for routing control and user plane messages to different home servers on different core networks.

In either case, the policy rule limits or prohibits incoming data from user equipment (e.g. wireless devices) that are not registered with or authorized to access the core network. Other core network elements, such as mobility management entities (MME) in 4G networks, or access and mobility function (AMF) in 5G networks, can transmit connection requests (e.g., authentication requests) to authenticate wireless devices to a specific HSS associated with a home network. The CRE (and equivalent routing servers or nodes) can check an identifier associated with the wireless device (e.g. international mobile subscriber identity or IMSI), and respond to another routing node (e.g. a DRA or STP) with a destination address of a home server, based on the identifier of the wireless device. For example, if the IMSI (or equivalent identifier) of the wireless device is within a range approved for access to a specific HSS, then an address or identifier of the specific HSS is returned. If the IMSI (or equivalent identifier) of the wireless device is not within the range approved for access to the specific HSS, or is associated with a different HSS, then an address or identifier of the different HSS is returned. The address or identifier is specific to a network implementation, and can include a transmission type (TT), message transfer part (MTP), GT, or equivalent, depending on the implementation, as further described below. Thus, a subscriber of a network can be routed to the correct home server, without any service interruptions, and regardless of whether the subscriber is connected to a home network, roaming network, visitor network, etc. So long as the logic for correlating identifiers (e.g. IMSI) with different home servers is provided at or near the routing servers associated with each core network (e.g. STP, DRA, or GTP), the subscriber's attach requests as well as control and user data can be routed to the appropriate home server on a core network that the subscriber is authorized to access.

The logic for performing these routing functions can be on any network node that is directly coupled to a DRA, STP, or GPRS tunneling protocol (GTP) server. In an example, a smart DRA (S-DRA) is coupled to a plurality of DRAs associated with a core network. In one example, in a 5G network, a security edge protection proxy (SEPP) performs similar functions to the described DRA. Other network nodes can be programmed with such logic. For example, such logic can be coupled to a processing node that is communicably coupled to a DRA, SEPP, MME, AMF, HSS, etc. In one example, the S-DRA comprises a processing node positioned between one or more existing DRAs associated with a home network, and the HSS associated with the home network. The logic executed by the processing node can instruct the DRA that a first subset of IMSIs is to be routed to a first HSS, and a second subset of IMSIs is to be routed to a second HSS. The processing node can check one or more IMSI range rules for traffic routing, responsive to receiving messages from the MME/AMF. If the IMSI is associated with a new home (that is, if the IMSI is associated with a mobile subscriber or wireless device that has completed a migration to a new network), then the message is returned with a new destination, and forwarded to the new HSS. If the IMSI belongs to old home (that is, the mobile subscriber or wireless device has not been migrated), then the logic sends the request back with a destination address that enables routing to the old HSS. In examples described herein, the message itself can include an attach request (e.g. from a wireless device associated with a wireless subscriber attempting to access network services), or session data for a data session (including control and user data packets associated with the session). Different examples are provided for different types of messages, and call flows using different protocols, e.g., LTE call flow (using S6A and DRA), SS7 call flow (using STP), and data call flows (using GTP). For example, different examples are provided for LTE registration messages, control plane messages, and user data messages. In one example, registration messages are first routed to a specific home server by a DRA or STP depending on the IMSI or other identifier, and then control and data messages are routed to the specific home server by a GTP proxy server.

Figure 1:
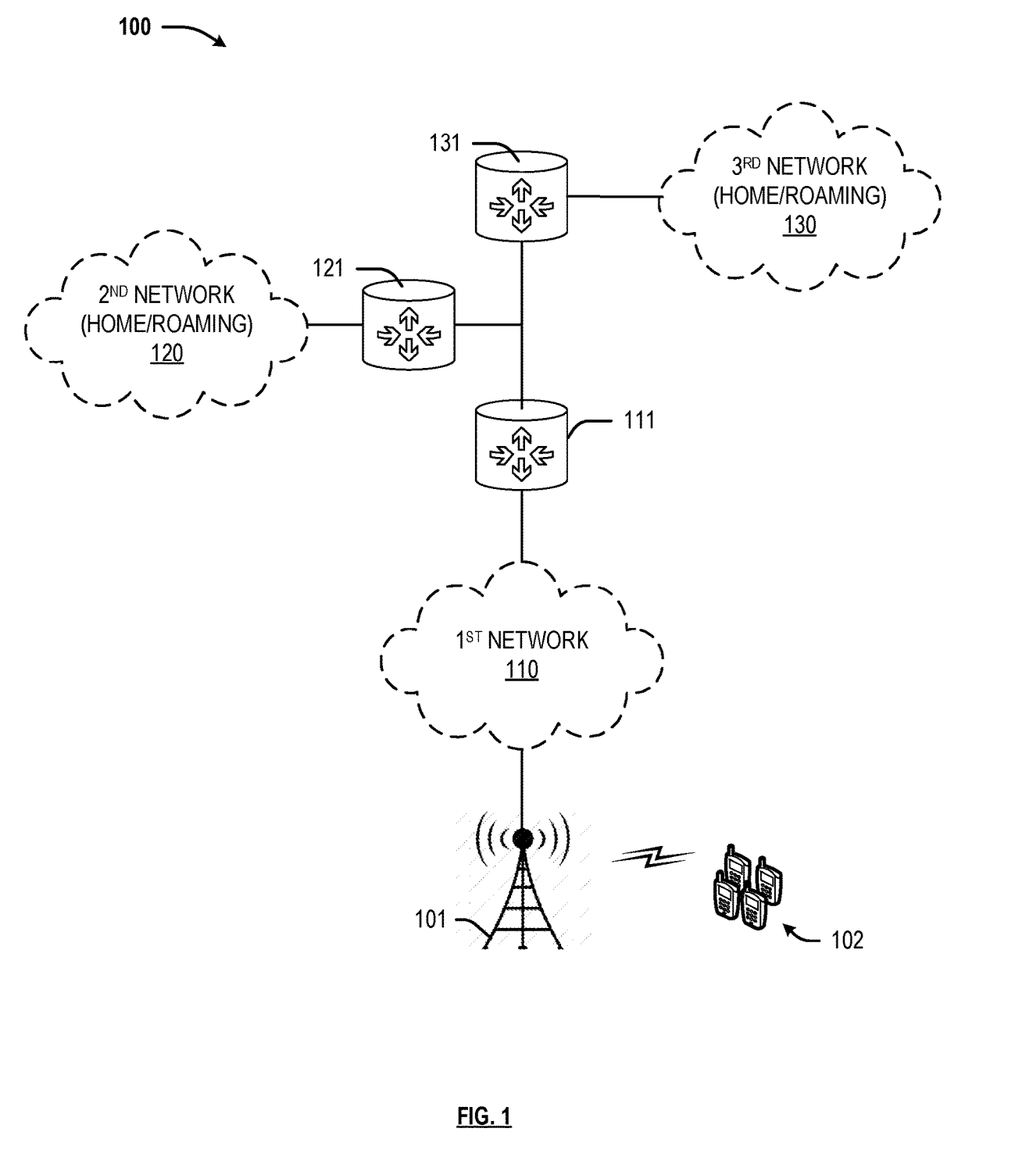
FIG. 1 depicts a system for routing subscriber traffic to different home servers.

FIG. 1 depicts a system 100 for routing subscriber traffic to different home servers. System 100 includes access node 101, wireless devices 102, a first network 110, a second network 120, a third network 130, and routing engines 111, 121, 131 associated with the first, second, and third networks respectively. Access node 101 deploys one or more wireless air interfaces to which wireless devices 102 can attach and access network services from one or more networks 110, 120, 130. For example, access node 101 can include any standard access node such as a macro-cell access node, base transceiver station, a radio base station, an eNodeB device, an enhanced eNodeB device, an a next generation NodeB device (gNodeB) in 5G networks, or the like. Alternatively, access node 101 may comprise any short range, low power, small-cell access node such as a microcell access node, a picocell access node, a femtocell access node, or a home eNodeB/gNodeB device. Further, wireless devices 102 may be any device, system, combination of devices, or other such communication platform capable of communicating wirelessly with access node 101 using one or more frequency bands deployed therefrom. Wireless device 102 may be, for example, a mobile phone, a wireless phone, a wireless modem, a personal digital assistant (PDA), a voice over internet protocol (VOIP) phone, a voice over packet (VOP) phone, or a soft phone, as well as other types of devices or systems that can send and receive audio or data. Other types of communication platforms are possible. Communication networks 110, 120, 130 can be wired and/or wireless communication networks, and can comprise processing nodes, routers, gateways, and physical and/or wireless data links for carrying data among various network elements, including combinations thereof, and can include a local area network a wide area network, and an internetwork (including the Internet). Communication networks 110, 120, 130 can be capable of carrying data, for example, to support voice, push-to-talk, broadcast video, and data communications by wireless device 102. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by system 100 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). System 100 can also comprise additional base stations, controller nodes, telephony switches, internet routers, network gateways, computer systems, communication links, or some other type of communication equipment, and combinations thereof.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements. Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 101, networks 110, 120, 130, and/or routing engines 111, 121, 131.

In this example, each network 110, 120, 130 further includes a routing engine 111, 121, 131 respectively. Routing engines 111, 121, 131 generally serve the function of routing messages, including connection requests, data packets, control/user data, etc., between wireless devices 102 and one or more entities on networks 110, 120, 130. For instance, routing engines can comprise a centralized routing engine (CRE) and can be communicatively coupled to one or more home servers (e.g. HLR, HSS, etc.) on each associated network 110, 120, 130. In some examples, the routine engines 111, 121, 131 can include one or more routing servers, including DRA, S-DRA, STP, S-STP, GTP proxy, and can be instructed to route connection requests (such as attach requests) as well as control and user plane messages to different home servers on different core networks 110, 120, 130. The routing can include enforcing a policy or rule on user data/traffic destined to a core network associated with the one or more home servers. In an example, the policy rule limits or prohibits incoming data from user equipment (e.g. wireless devices 102) that are not registered with or authorized to access the home servers on a particular network. Other core network elements not shown herein, such as MMEs, AMFs, MSS, SGSN, etc., can transmit connection requests or messages to authenticate wireless devices to a specific HSS associated with a home network. Each routing engine 111, 121, 131 (or routing servers or nodes therein) can check an identifier associated with the wireless devices 102 (e.g., IMSI), and respond to another routing node (e.g. a DRA or STP respectively coupled thereto) with a destination address of a home server on one of networks 110, 120, 130 or any other network, based on the identifier of the wireless device 102. For example, if the IMSI (or equivalent identifier) of the wireless device 102 is within a range approved for access to a specific HSS, then an address or identifier of the specific HSS is returned. If the IMSI (or equivalent identifier) of the wireless device 102 is not within the range approved for access to the specific HSS, or is associated with a different HSS, then an address or identifier of the different HSS is returned.

In an example, a routing engine 111, 121, 131 comprises a smart DRA (S-DRA) is coupled to a plurality of DRAs associated with a network 110, 120, 130 respectively. Other network nodes can be programmed with such logic. For example, such logic can be coupled to a processing node that is communicably coupled to a DRA, SEPP, MME, AMF, HSS, etc. In one example, the S-DRA comprises a processing node positioned between one or more existing DRAs associated with a home network, and the HSS associated with the home network. The logic executed by the processing node can instruct the DRA that a first subset of IMSIs is to be routed to a first HSS, and a second subset of IMSIs is to be routed to a second HSS. The processing node can check one or more IMSI range rules for traffic routing, responsive to receiving messages from the MME/AMF. If the IMSI is associated with a new home (that is, if the IMSI is associated with a mobile subscriber or wireless device that has completed a migration to a new network), then the message is returned with a new destination, and forwarded to the new HSS. If the IMSI belongs to old home (that is, the mobile subscriber or wireless device has not been migrated), then the logic sends the request back with a destination address that enables routing to the old HSS. In examples described herein, the message itself can include an attach request (e.g. from a wireless device associated with a wireless subscriber attempting to access network services), or session data for a data session (including control and user data packets associated with the session). Different examples are provided for different types of messages, and call flows using different protocols, e.g., LTE call flow (using S6A and DRA), SS7 call flow (using STP), and data call flows (using GTP). For example, different examples are provided for LTE registration messages, control plane messages, and user data messages. In one example, registration messages are first routed to a specific home server by a DRA or STP depending on the IMSI or other identifier, and then control and data messages are routed to the specific home server by a GTP proxy server.

Figure 2:
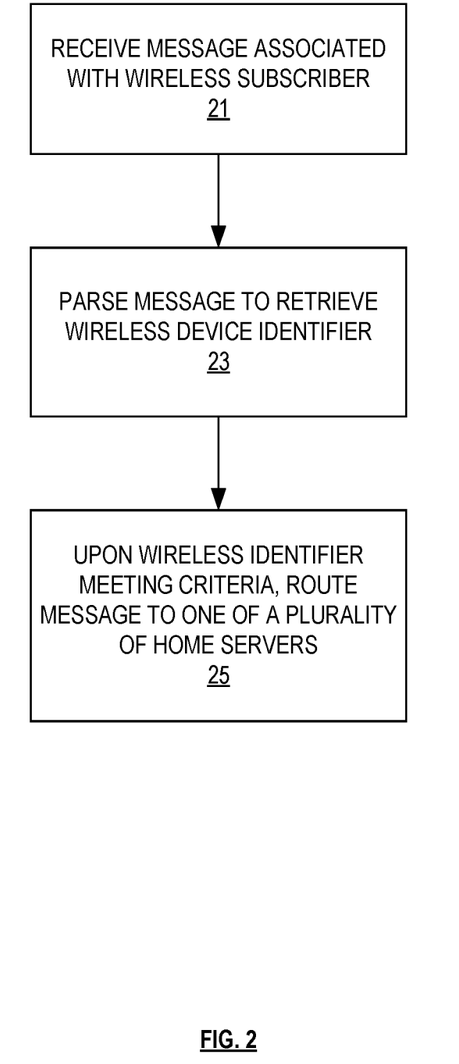
FIG. 2 depicts a method for routing subscriber traffic to different home servers.

FIG. 2 depicts a method for routing subscriber traffic to different home servers. The method of FIG. 2 may be implemented by a processing node communicatively coupled to one or more routing nodes, controller nodes, or any other network node. Although FIG. 2 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 21, a message associated with a wireless subscriber is received at a routing engine, for instance, a centralized routing engine (CRE) that comprises one or more of an STP, DRA, or equivalent routing server. At 23, the message is parsed to retrieve a wireless device identifier. The wireless device identifier can comprise an IMSI. At 25, upon the wireless device identifier meeting one or more criteria, the message is routed to one of a plurality of home servers. The criteria can include an IMSI range associated with a home server on a particular core network, such that if the IMSI falls within the range, the message is routed to the home server. Such a policy rule limits or prohibits incoming data from user equipment (e.g. wireless devices) that are not registered with or authorized to access the particular core network. Further, this enables messages from non-subscriber wireless devices to be appropriately routed to a different home server, e.g. a roaming network. Implementing such logic on any type of network, including visitor networks, ensures that subscribers of a particular network will be routed to the appropriate home server. Thus, a subscriber of a network can be routed to the correct home server, without any service interruptions, and regardless of whether the subscriber is connected to a home network, roaming network, visitor network, etc. So long as the logic for correlating identifiers (e.g. IMSI) with different home servers is provided at or near the routing servers associated with each core network (e.g. STP, DRA, or GTP), the subscriber's attach requests as well as control and user data can be routed to the appropriate home server on a core network that the subscriber is authorized to access.

Figure 3:
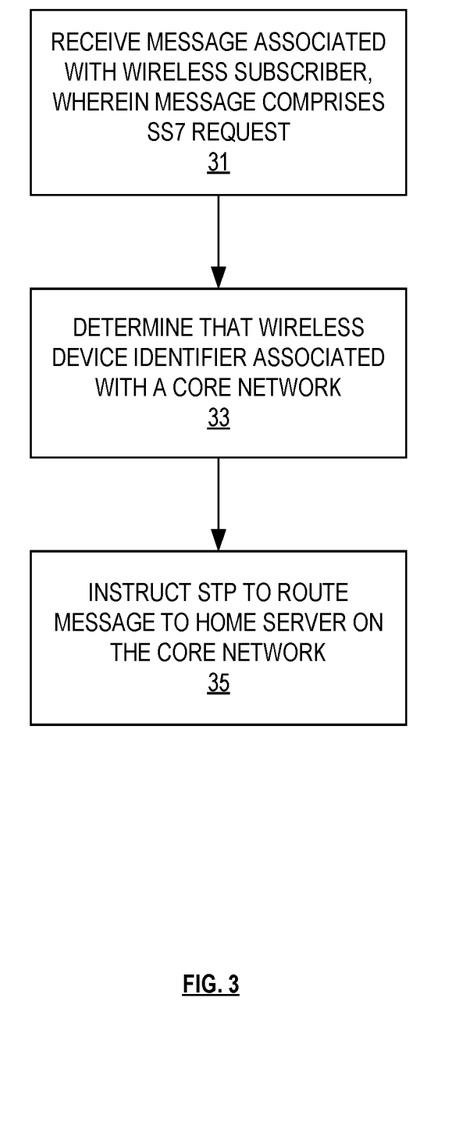
FIG. 3 depicts a method for routing SS7 messages to different home servers.

FIG. 3 depicts a method for routing SS7 messages to different home servers. The method of FIG. 3 may be implemented by a processing node communicatively coupled to one or more routing nodes, controller nodes, or any other network node. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 31, a message associated with a wireless subscriber is received at a routing engine, for instance, a centralized routing engine (CRE) that comprises one or more of an STP, DRA, or equivalent routing server. The message can comprise an SS7 request. At 33, the message is parsed to retrieve a wireless device identifier. The wireless device identifier can comprise an IMSI. At 35, upon the wireless device identifier meeting one or more criteria, the message is routed to one of a plurality of home servers. The criteria can include an IMSI range associated with a home server on a particular core network, such that if the IMSI falls within the range, the message is routed to the home server. Such a policy rule limits or prohibits incoming data from user equipment (e.g. wireless devices) that are not registered with or authorized to access the particular core network. Further, this enables messages from non-subscriber wireless devices to be appropriately routed to a different home server, e.g. a roaming network. Routing the message can include instructing an STP to route the message. For example, a smart-STP (S-STP) can directly send a message to a point code associated with a home server (e.g. HLR), based on a point code utilized by the HLR, since each node in a SS7 system has a unique point code. For example, the S-STP can include the appropriate HLR point code in the message, which is returned to the STP, whereupon the STP can automatically route the message to the appropriate HLR (i.e., home server). In an example, the S-STP can modify a transmission parameter, such as a transmission type (TT), message transfer part (MTP), global title (GT), etc. The TT can be used by the STP to route the message to the appropriate HLR. A unique TT can be defined, that is not previously defined, that the STP is programmed to re-route the message to the destination. In this case, when the transmission type is modified to a new unique TT value, the STP can properly route the message. This is intended to avoid network looping, congestion, and traffic disturbances. Other routing indicators that are modified can be envisioned by those having ordinary skill in the art in light of this disclosure. For example, any other routing parameter can be modified to avoid network looping.

Figure 4:
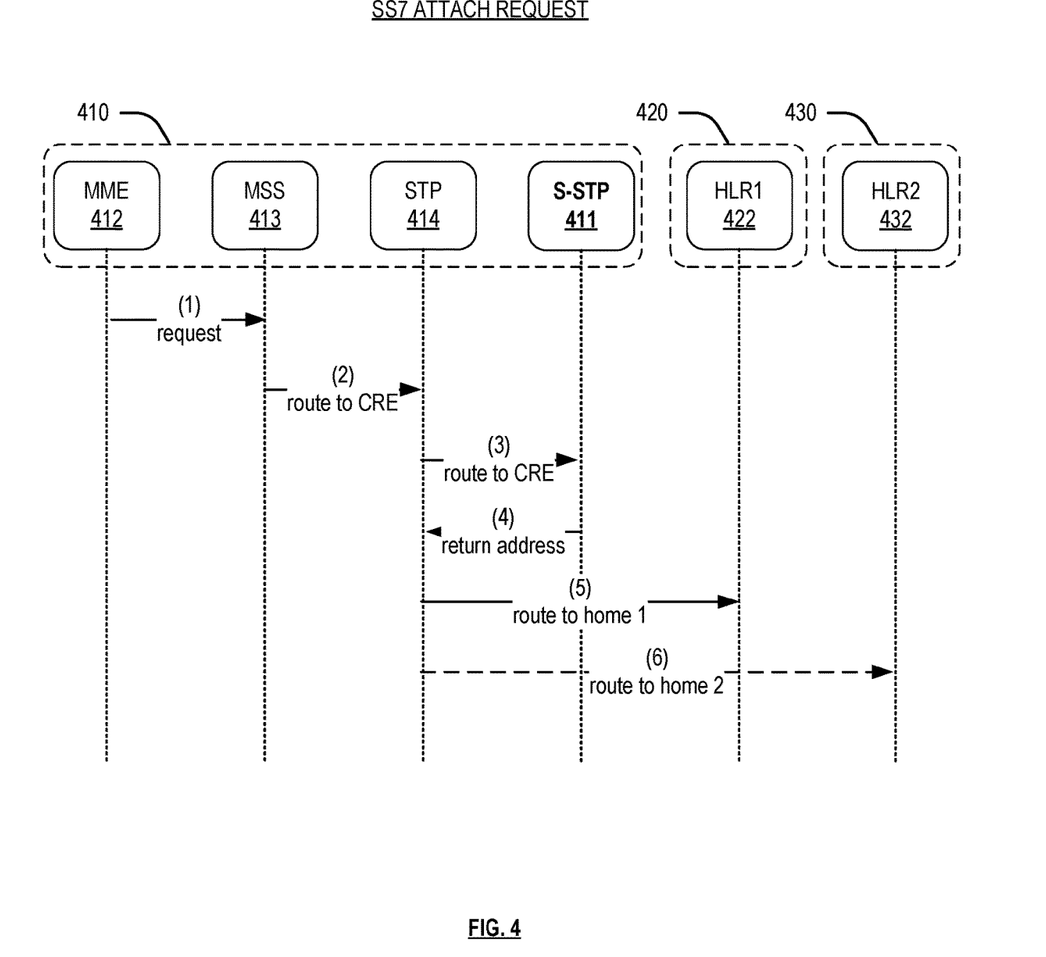
FIG. 4 depicts a call flow for routing SS7 messages to different home servers.

FIG. 4 depicts a call flow for routing SS7 messages to different home servers. In the SS7 context, the call flow involves numerous network nodes, including but not limited to a smart STP (S-STP) 411 that functions as a first routing server, a mobility management entity (MME) 412, a mobile switching server (MSS) 413, an STP 414 that functions as a second routing server, a first HLR 422 and a second HLR 432. In this example, MME 412, MSS 413, STP 414, and S-STP 411 are part of a first network 410, HLR 422 is part of a second network 420, and HLR 432 is part of a third network 430. It will be understood by those having ordinary skill in the art, in light of this disclosure, that other network elements for implementing this example call flow are not shown herein but can be included as needed, such as additional gateways, routing nodes, etc.

At step 1, the MME 412 transmits a message to the MSS 413. The message can be an SS7 request, and uses the SGs interface. At step 2, the MSS routes the message to the CRE (which can comprise one or both STP 414 and S-STP 411). This can include routing the message to the point code associated with one or both of the STP 414 or the S-STP 411. In either case, at step 3 the STP 414 routes the message to the S-STEP 411, whereupon the S-STP 411 performs a lookup (using, for example, a local database) to determine whether or not an identifier such as an IMSI associated with the message meets a criteria. For example, if the IMSI is within a range of IMSIs allowed to access first HLR 422, then the message is routed to the first HLR 422. If the IMSI is not within the range, then the message is routed to the second HLR 432. Since HLRs 422/432 can be on different networks, the IMSI ranges can be dynamic in that multiple ranges associated with different HLRs can be defined. Further, the S-STP 411 can modify a transmission parameter, such as a transmission type (TT), message transfer part (MTP), global title (GT), etc., prior to returning the message with the return address at step 4. The TT can be used by the STP 414 to route the message to the appropriate HLR. A unique TT can be defined, that is not previously defined, via which the STP 414 is programmed to re-route the message to the destination at steps 5 or 6.

Figure 5:
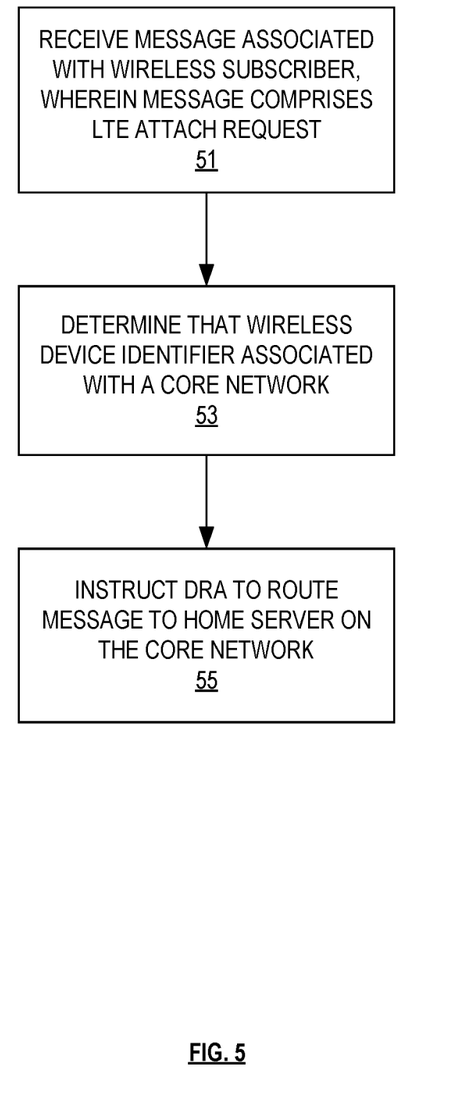
FIG. 5 depicts a method for routing LTE connection requests to different home servers.

FIG. 5 depicts a method for routing LTE connection requests to different home servers. The method of FIG. 5 may be implemented by a processing node communicatively coupled to one or more routing nodes, controller nodes, or any other network node. Although FIG. 2 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 51, a message associated with a wireless subscriber is received at a routing engine, for instance, a centralized routing engine (CRE) that comprises one or more of an STP, DRA, or equivalent routing server. The message can comprise an LTE attach request. At 53, the message is parsed to retrieve a wireless device identifier. The wireless device identifier can comprise an IMSI. At 55, upon the wireless device identifier meeting one or more criteria, the message is routed to one of a plurality of home servers. The criteria can include an IMSI range associated with a home server on a particular core network, such that if the IMSI falls within the range, the message is routed to the home server. Such a policy rule limits or prohibits incoming data from user equipment (e.g. wireless devices) that are not registered with or authorized to access the particular core network. Further, this enables messages from non-subscriber wireless devices to be appropriately routed to a different home server, e.g. a roaming network. Routing the message can include instructing a DRA to route the message. For example, in the case the message is a LTE attach request message, an S-DRA interacts with one or more DRAs and routes the migrated vs non-migrated IMSI(s) between different home servers (e.g. HSS). An S-DRA can lookup a database of different IMSI ranges to determine the appropriate home server for the IMSI received in the LTE attach request.

Figure 6:
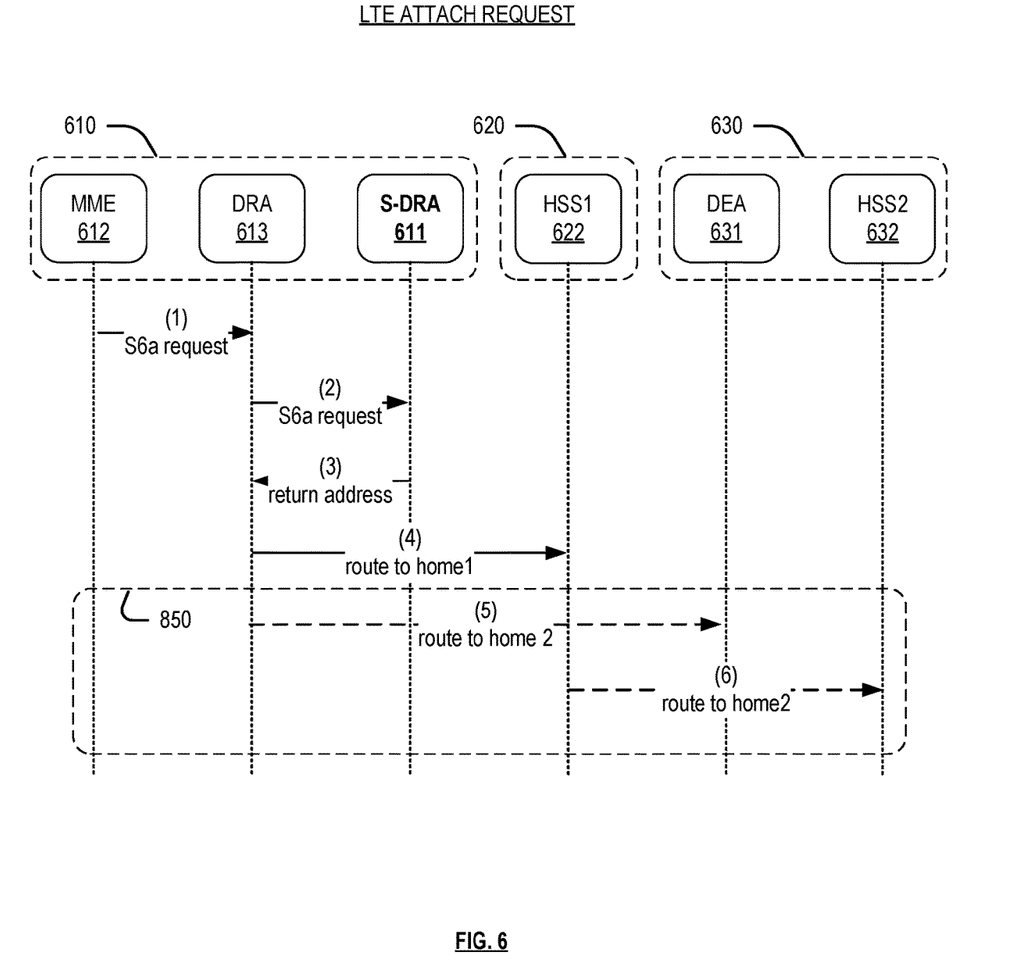
FIG. 6 depicts a call flow for routing LTE connection requests to different home servers.

FIG. 6 depicts a call flow for routing LTE connection requests to different home servers. In the LTE attach context, the call flow involves numerous network nodes, including but not limited to a S-DRA 611 that functions as a first routing server, a MME 612, a DRA 613 that functions as a second routing server, a first HSS 622 (i.e. first "home" server), a diameter edge agent (DEA) 631 that functions as a third routing server, and a second HSS 632 (i.e. second "home" server). In this example, MME 612, DRA 613, and S-DRA 611 are part of a first network 610, HSS 622 is part of a second network 620, and DEA 631 and HSS 632 are part of a third network 630. It will be understood by those having ordinary skill in the art, in light of this disclosure, that other network elements for implementing this example call flow are not shown herein but can be included as needed, such as additional gateways, routing nodes, etc.

At step 1, the MME 612 transmits a message to the DRA 613. The message can be an LTE attach request, and uses the S6a interface. At step 2, the DRA routes the message to the S-DRA 611, whereupon the S-DRA 611 performs a lookup (using, for example, a local database) to determine whether or not an identifier such as an IMSI associated with the message meets a criteria. For example, if the IMSI is within a range of IMSIs allowed to access first HSS 622, then the message is routed to the first HSS 622. If the IMSI is not within the range, then the message is routed to the second HSS 632. Since HSS 422/432 can be on different networks, the IMSI ranges can be dynamic in that multiple ranges associated with different HSS can be defined. In this example, at step 3, the S-DRA 611 determines the home server (i.e. HSS) for the specific IMSI based on the range lookup, and routes the message back to the DRA 613 with the new destination address. Further, the DRA 613 is programmed to receive the message with the new destination address, and to avoid transmitting the message back to the S-DRA (as it would typically do if the address was not modified). Thus, the S-DRA 611 maintains the incoming and outgoing message path to avoid looping the message back and forth between the DRA 613 and S-DRA 611. In this example, multiple DRAs 613 may be provided on network 610, such that incoming and outgoing message paths are different, resulting in avoiding network looping.

Figure 7:
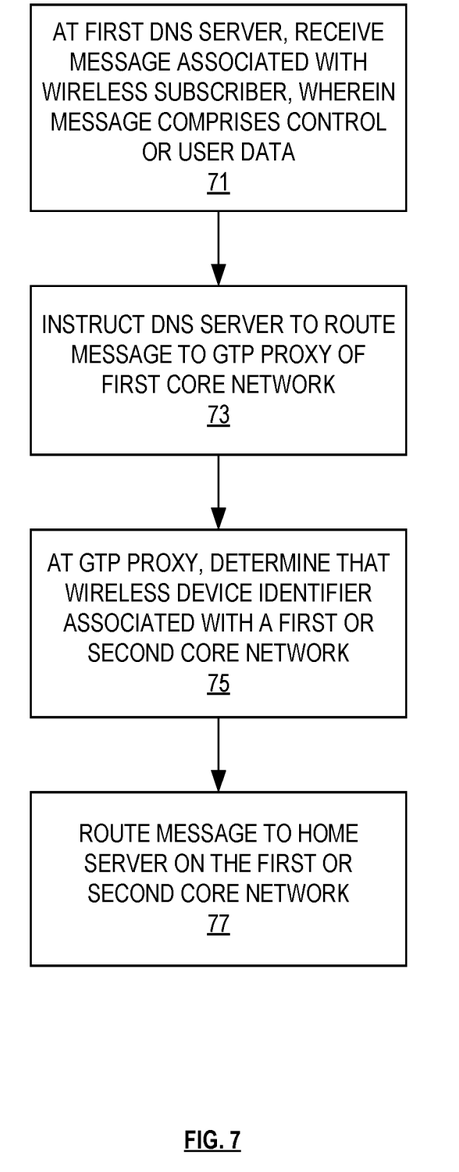
FIG. 7 depicts a method for routing GTP messages to different home servers.

FIG. 7 depicts a method for routing GTP messages to different home servers. The method of FIG. 7 may be implemented by a processing node communicatively coupled to one or more routing nodes, controller nodes, or any other network node. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 71, a message associated with a wireless subscriber device is received at a first domain name server (DNS). The message can include a control plane data packet associated with a user plane data session in which the device is engaged. Thus, it will be understood that this method can be performed subsequent to the SS7 and LTE methods and call flows described in FIGS. 3-6. At 73, the first DNS server is instructed to route the message to a GTP proxy associated with a first core network. For example, if the message originated from a wireless device attached to a visitor network, then the message would be routed (via the first DNS server) to the GTP proxy server associated with a home network for the wireless device. At 75, the message is parsed at the GTP proxy server to retrieve a wireless device identifier, such as an IMSI. Upon the wireless device identifier meeting one or more criteria, the message is routed to one of a plurality of home servers associated with a particular core network. This limits or prohibits incoming data from user equipment (e.g. wireless devices) that are not registered with or authorized to access the particular core network, while enabling messages from non-subscriber wireless devices to be appropriately routed to a different home server, e.g. a roaming network.

Figure 8:
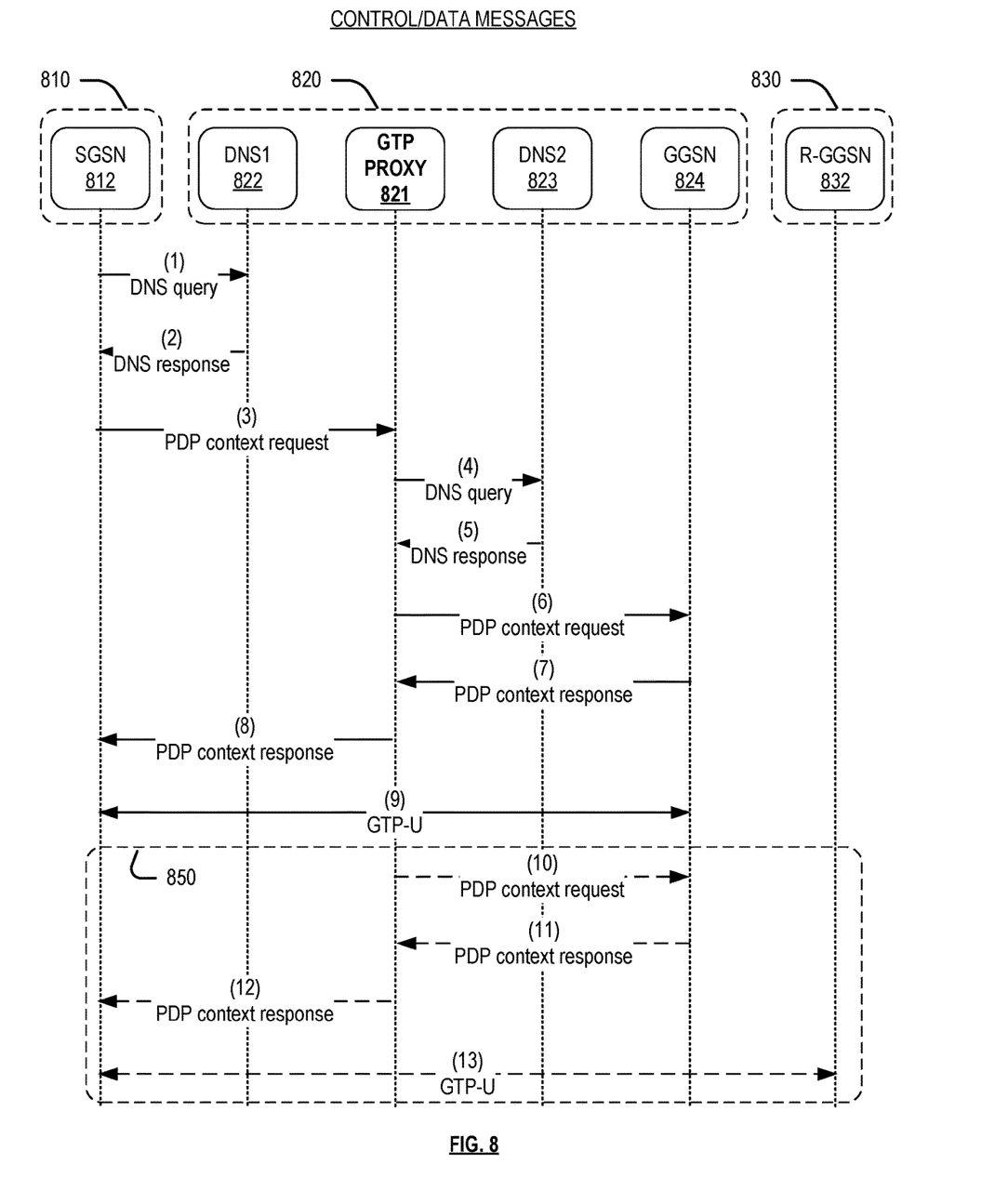
FIG. 8 depicts a call flow for routing GTP messages to different home servers.

FIG. 8 depicts a call flow for routing GTP messages to different home servers. In the control/data session context, the call flow involves numerous network nodes, including but not limited to a Serving GPRS support node (SGSN) 812, a first DNS server 822, a GTP proxy 821 that functions as a routing engine, a second DNS server 823, a first Gateway GSN (GGSN) 824 acting a gateway for network 820, and a second GGSN (R-GGSN) 832, acting as a gateway for roaming network 830. SGSN 812 is part of a first (e.g. serving) network 810, and DNS 822, GTP proxy 821, DNS 823, and GGSN 824 are part of second network 820. It will be understood by those having ordinary skill in the art, in light of this disclosure, that other network elements for implementing this example call flow are not shown herein but can be included as needed, such as additional gateways, DNS servers, routing nodes, etc.

At step 1, SGSN 812 transmits a DNS query (via, for example, another DNS server associated with network 810 but not illustrated herein) to DNS server 822. DNS server 822 responds with an IP address for GTP proxy server 821. Upon receiving this IP address, SGSN 812 transmits a packet data protocol (PDP) context request to the GTP proxy 821. Packet Data Protocol (PDP) context is a data structure that allows the device to transmit. data using Internet Protocol (IP). It includes the device's IP address, IMSI, and additional parameters to properly route data to and from the network. GTP proxy server 821 includes logic for processing packets in the GTP control plane and in the GTP user plane. Thus at GTP proxy server 821, a prefix is created on a DNS query such that wireless devices associated with a specified IMSI value range are associated with a migrated subscriber group, with messages intended to be delivered to one of GGSN 824 or R-GGSN 832 (i.e. home servers). Thus, the GTP 821 can perform a lookup of the IMSI to match a criteria of ranges correlated with different home servers, and return the IP address of the appropriate home server.

To enable this, in one embodiment, the GTP proxy server 821 can simply add (or modify) a prefix associated with the appropriate home server to the PDP context request, e.g. in steps 6 and 10 (where steps 10-12 are performed for roaming subscribers directed to R-GGSN 832). In other words, the GTP proxy server 821 can create internal DNS (adding a home or roaming server prefix), applying its own logic to determine if the subscriber belongs to a migrated group, and then respond back in step 8 with the appropriate home server's IP address, enabling the user plane to flow directly from SGSN 812 to GGSN 824 (at step 9) or to R-GGSN (at step 12). Optionally, the GTP proxy 821 performs a lookup with DNS server 823 at step 4, which returns the address of the appropriate home server at step 5. The end result is the same in either example, with a GTP-U session being set up either with GGSN 824 at step 9 or with R-GGSN 832 at step 12.

The exemplary embodiments described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The invention claimed is:

1. A method for routing subscriber messages to different home servers, comprising:
   receiving, at a routing server including a general packet radio services tunneling protocol (GTP) proxy server and coupled to at least one home server within a first core network, a first message associated with a first wireless subscriber attempting to access network services from one or more core networks, the first message including a first packet data protocol (PDP) context request;
   parsing the first message at the routing server to retrieve a first wireless device identifier, the first wireless device identifier indicating a corresponding home server of the first wireless subscriber;
   upon the first wireless device identifier meeting a criteria, routing the first message to one of a plurality of home servers associated with the first core network;
   receiving at the routing server coupled to the at least one home server within the first core network, a second message associated with a second wireless subscriber attempting to access network services from the one or more core networks, the second message including a second packet data protocol (PDP) context request;
   parsing the second message at the routing server to retrieve a second wireless device identifier, the second wireless device identifier indicating a corresponding home server of the second wireless subscriber;
   adding or modifying a prefix associated with the corresponding home server to the second PDP context request;
   upon the second wireless device identifier not meeting the criteria, determining and returning, by the routing server, a destination internet protocol (IP) address of the corresponding home server corresponding to the second wireless subscriber based on the second wireless identifier, wherein the corresponding home server for the second wireless subscriber acts as a gateway for a second core network, wherein the second core network is a roaming network and the destination IP address associated with the corresponding home server of second core network is different from the IP address of any of the plurality of home servers associated with first core network; and
   routing the second message to the destination IP address of the home server corresponding to the second wireless subscriber within the second core network.

2. The method of claim 1, wherein the criteria comprises a range of wireless device identifiers associated with the first core network.

3. The method of claim 1, further comprising:
   receiving an SS7 connection request at a signal transfer point (STP) routing server, the SS7 connection request including the first wireless device identifier, and
   routing the SS7 connection request to the one of the plurality of home servers based on the first wireless device identifier.

4. The method of claim 1, further comprising changing a transmission parameter of the first message to a new transmission parameter associated with the one of the plurality of home servers.

5. The method of claim 4, wherein the transmission parameter comprises at least one of a transmission type (TT), message transfer part (MTP), or global title (GT).

6. The method of claim 1, further comprising:
   receiving a long-term evolution (LTE) attach request including the first wireless device identifier at diameter routing agent (DRA) routing server, and
   instructing the DRA to route the first message to the one of the plurality of home servers based on the first wireless device identifier.

7. The method of claim 1, wherein:
   the first message comprises a data packet associated with a data session, and
   routing the first message comprises changing a destination address at the GPRS tunneling protocol (GTP) proxy server.

8. The method of claim 7, further comprising instructing a domain name server (DNS) to route the first message to the GTP proxy server.

9. A system for routing subscriber messages to different home servers, the system comprising:
   multiple core networks;
   one or more routing servers respectively associated with each of the multiple core networks, the routing servers including a general packet radio services tunneling protocol (GTP) proxy server; and
   a processing node communicatively coupled to the one or more routing servers, the processing node comprising at least a memory and a processor for performing operations comprising:
      receiving a message associated with a wireless device attempting to attach to the one of the multiple core networks, the message including a packet data protocol (PDP) context request;
      parsing the message to retrieve a subscriber identifier, the subscriber identifier indicating a first corresponding home server of the wireless device;
      upon the subscriber identifier meeting a criteria, routing the message to the first corresponding home server associated with a first core network;
      upon the subscriber identifier not meeting the criteria, determining and returning, a destination internet protocol (IP) address of a second corresponding home server, wherein the second corresponding home server acts as a gateway for a second core network, wherein the second core network is a roaming network and the destination IP address associated with the second corresponding home server of the second core network is different from a destination IP address of the first corresponding home server of the first core network;

adding or modifying a prefix associated with the second corresponding home server to the PDP context request; and routing the message to the destination IP address of the second corresponding home server corresponding to the wireless device within the second core network.

10. The system of claim 9, wherein the subscriber identifier comprises an international mobile subscriber identity (IMSI).

11. The system of claim 9, further comprising one or more of a diameter routing agent (DRA) routing server, and a signal transfer point (STP) routing server.

12. The system of claim 9, wherein the first or second corresponding home server comprises one or more of a home subscriber server (HSS), a home location register (HLR), or a gateway GPRS support node (GGSN).

13. The system of claim 9, further comprising changing a transmission parameter of the message to a new transmission parameter associated with the second corresponding home server, wherein the transmission parameter comprises at least one of a transmission type (TT), message transfer part (MTP), or global title (GT).

14. A processing node for routing subscriber messages to different home servers within different core networks, the processing node comprising a processor and a memory, the memory for storing logic that is executed by the processor to perform operations including:

instructing a first routing server, the first routing server including a general packet radio services tunneling protocol (GTP) proxy server and coupled to a first core network, that messages including a packet data protocol (PDP) context request from a first subset of mobile subscriber identifiers are routed to a first home server within the first core network; and instructing the first routing server that messages including a packet data protocol (PDP) context request from a second subset of mobile subscriber identifiers are routed to a second home server within a second core network, wherein the second home server acts as a gateway for a second core network and the second core network is a roaming network and wherein upon determining that the mobile subscriber identifier is from the second subset of mobile subscriber identifiers, instructing the first routing server to add or modify a prefix associated with the second home server to the PDP context request and route the messages to the second home server, wherein routing the messages to the second home server within the second core network comprises updating a destination address of the message with an internet protocol (IP) address of the second home server, wherein the processing node determines which of the first and second subsets of mobile subscriber identifiers is associated with the first core network or second core network based on checking one or more IMSI range rules.

15. The processing node of claim 14, wherein the processing node is positioned between one or more existing routing servers associated with the first core network and the first home server associated with the first core network.

16. The processing node of claim 14, wherein the operations are performed responsive to receiving the messages from a controller node.

17. The processing node of claim 14, wherein the processing node further instructs a diameter routing agent DRA server and a signal transfer point (STP) routing server.

18. The processing node of claim 14, wherein the messages comprise a data packet associated with a data session.

* * * * *